United States Patent
Lowenthal et al.

(10) Patent No.: US 10,474,797 B2
(45) Date of Patent: Nov. 12, 2019

(54) ELECTRONIC STORAGE SYSTEM

(71) Applicant: Tiburon Lockers Inc., Rockleigh, NJ (US)

(72) Inventors: Jared Lowenthal, Norwood, NJ (US); Thomas Little, Joppa, MD (US); Shuangqing Wang, Bergenfield, NJ (US); Jianyun Gao, Bergenfield, NJ (US); Sung-Yuan Chen, Jersey City, NJ (US)

(73) Assignee: Tiburon Lockers Inc., Rockleigh, NJ (US)

( * ) Notice: Subject to any disclaimer, the term of this patent is extended or adjusted under 35 U.S.C. 154(b) by 306 days.

(21) Appl. No.: 15/084,298

(22) Filed: Mar. 29, 2016

(65) Prior Publication Data
US 2017/0286649 A1    Oct. 5, 2017

(51) Int. Cl.
G06F 21/00 (2013.01)
G06F 21/31 (2013.01)
G06Q 20/40 (2012.01)

(52) U.S. Cl.
CPC ............ G06F 21/31 (2013.01); G06Q 20/40 (2013.01)

(58) Field of Classification Search
CPC ................................ G06F 21/31; G06Q 20/40
See application file for complete search history.

(56) References Cited

U.S. PATENT DOCUMENTS

| | | |
|---|---|---|
| 4,698,630 A | 10/1987 | Ellsberg |
| 5,169,222 A | 12/1992 | Bollore et al. |
| 5,231,272 A | 7/1993 | Mardon |
| 5,345,379 A | 9/1994 | Brous et al. |
| 5,894,277 A | 4/1999 | Keskin et al. |
| 5,946,660 A | 8/1999 | McCarty et al. |
| 6,185,773 B1 | 2/2001 | Goedde |
| 6,655,180 B2 | 12/2003 | Gokcebay et al. |
| 6,694,217 B2 | 2/2004 | Bloom |
| 6,791,450 B2 | 9/2004 | Gokcebay et al. |
| 6,806,807 B2 | 10/2004 | Cayne et al. |
| 6,879,243 B1 | 4/2005 | Booth et al. |
| 6,882,269 B2 | 4/2005 | Moreno |
| 6,999,825 B2 | 2/2006 | Inomata |
| 7,012,503 B2 | 3/2006 | Nielsen |
| 7,068,149 B2 | 6/2006 | Lee et al. |
| 7,176,782 B2 | 2/2007 | Shitan |
| 7,445,300 B2 | 11/2008 | Collins et al. |
| 7,477,132 B2 | 1/2009 | Mayer et al. |

(Continued)

Primary Examiner — Brandon S Hoffman
Assistant Examiner — Helai Salehi
(74) Attorney, Agent, or Firm — DeMatteo Law

(57) ABSTRACT

An electronic storage system is provided. The system includes a housing, securable units within the housing, a kiosk to assign securable units to users and to provide the users with access credentials for accessing assigned securable units, and user portals within the housing and separate from the kiosk. Each user portal permits access to one or more of the securable units in accordance with access credentials entered into the portal. Each user portal is also operable to allow users to transfer rentals of assigned securable devices to other electronic storage systems. The system also permits access to assigned securable devices in accordance with access credentials received via text or SMS messages or via applications executing on a computer, NFC device, or smart device, such as a smart phone or tablet.

20 Claims, 11 Drawing Sheets

(56) References Cited

U.S. PATENT DOCUMENTS

| | | |
|---|---|---|
| 7,828,399 B1 | 11/2010 | Bass |
| 7,880,585 B1 | 2/2011 | Aronson et al. |
| 8,253,533 B2 | 8/2012 | Jones |
| 8,500,012 B2 | 8/2013 | Amdahl et al. |
| 8,990,110 B2 | 3/2015 | Mullin et al. |
| 2005/0190037 A1 | 9/2005 | Shitan et al. |
| 2009/0033456 A1 | 2/2009 | Castillo et al. |
| 2010/0102780 A1 | 4/2010 | Koh |
| 2011/0301748 A1 | 12/2011 | Lacarpentier |
| 2012/0078413 A1 | 3/2012 | Baker, Jr. |
| 2012/0098493 A1 | 4/2012 | Budike |
| 2014/0316918 A1 | 10/2014 | Zaniker et al. |
| 2014/0354403 A1* | 12/2014 | Zaniker .............. G06Q 30/0645 340/5.54 |
| 2015/0102711 A1 | 4/2015 | Zaniker et al. |
| 2015/0179006 A1* | 6/2015 | Von Zurmuehlen .... G07F 17/12 340/5.54 |
| 2015/0356801 A1* | 12/2015 | Nitu ................... G07C 9/00912 340/5.61 |

\* cited by examiner

ELECTRONIC STORAGE SYSTEM

FIELD OF INVENTION

The present invention relates to electronic storage systems and, in particular, to electronic storage systems for renting storage compartments at various venues.

BACKGROUND OF THE INVENTION

It is often desirable for entertainment and other venues, such as water parks and ski resorts, to provide means by which customers can securely store their personal belongings while visiting various attractions at the venue or engaging in other activities. Some venues and locker companies provide customers with access to coin operated locker systems, which allow customers to rent compartments by inserting one or more coins into a payment slot adjacent to or on the compartment. While coin operated locker systems provide an ability for customers to secure their belongings, they suffer from numerous disadvantages. For example, such systems, being mechanical in nature, are prone to breakdown. They also require personnel to periodically retrieve large amounts of coins inserted by customers, which can be labor intensive and time consuming.

Other venues and locker companies provide customers with access to electronic locker systems. Such systems typically comprise a bank of compartments and a kiosk that allows a customer to rent and access one or more of the compartments using credit cards, cash or other forms of payment. After completing the rental process, the user secures his/her personal belongings in the rented compartment. To access the compartment, the user enters a personal identification code (e.g., a PIN or password) into the kiosk, which then opens the rented compartment electronically.

While electronic locker systems address many of the problems of coin operated lockers, they still suffer from numerous disadvantages. For example, such systems are prone to user congestion or queuing at the kiosk, as only a single kiosk is provided for rental and access functions. Queuing in such systems is particularly problematic when demand for locker services is higher than normal, for example, at closing time or at the end of specially scheduled events when large groups of customers may wish to access the locker system at the same time. At these peak times, customers may be forced to wait in line to access and/or rent a compartment, thereby causing customer frustration and discontent. Long lines also reduce security, as sensitive information entered by a customer at a kiosk may be visible to other customers waiting in line. Queuing may result even when multiple kiosks are employed, as secondary kiosks are often positioned at significant distances from the storage compartments or at other inconvenient locations throughout a venue. These secondary kiosks are often ignored or utilized less frequently by customers.

To address these concerns, electronic locker systems have been developed with individual access keypads on each compartment. In this manner, a customer may bypass the kiosk and obtain compartment access by entering his/her personal identification code directly into the keypad on the rented compartment. While these systems reduce queuing by allowing multiple customers to access compartments at the same time, they suffer from the disadvantage of requiring specialized hardware and software on each and every compartment door. This added complexity reduces the reliability of the system and increases costs significantly. These systems are also prone to congestion and crowding in instances where multiple customers with rented compartments in close proximity seek to access their respective compartments at the same time. This problem is particularly acute in situations where customers wish to simultaneously access compartments in the same column. These systems also do nothing to reduce rental queuing, as customers must still interface with the kiosk to rent a compartment. This is especially concerning, as rental queuing is expected to worsen in the future, as locker system manufactures adopt Europay-MasterCard-Visa ("EMV") technology for processing rental payments by credit card. EMV technology, while adding security to credit card transactions, requires significantly more time for processing payments, thereby increasing the time required for customers to interact with kiosks.

SUMMARY OF THE INVENTION

Embodiments of the present invention solve queuing problems and other disadvantages of the prior art by providing an electronic storage system having a plurality of user portals conveniently embedded within the housing of the system and, more particularly, on rails between successive columns of securable devices, such as storage compartments, or on the securable devices themselves. A customer can access or transfer his/her assigned compartment by entering access credentials, such as a personal identification code, into one of the user portals. In this way, the customer is provided with multiple different locations at which he/she can access or transfer an assigned compartment, thereby reducing access queuing and improving customer satisfaction. Rental queuing is also reduced by enabling the user portals to perform and process payments for compartment rentals.

In other embodiments, each user portal is operable to permit access only to a subset of storage compartments, such as, for example, only storage compartments in a column immediately adjacent to the user portal. This embodiment further reduces queuing by naturally dividing customers into subsets, each of which is required to use a specific user portal for accessing compartments. Queuing may be reduced even further in this embodiment by ensuring that a process for renting storage compartments more evenly distributes rentals among the different user portals.

In other embodiments, customers are provided with an ability to unlock and access a rented storage compartment by texting or SMS messaging their personal identification codes to an access telephone number assigned to the electronic storage system. By allowing access via text or SMS messages, user portals and the kiosk may be bypassed, thereby substantially reducing (or even eliminating) customer queuing for compartment access.

DETAILED DESCRIPTION

Figure 1:
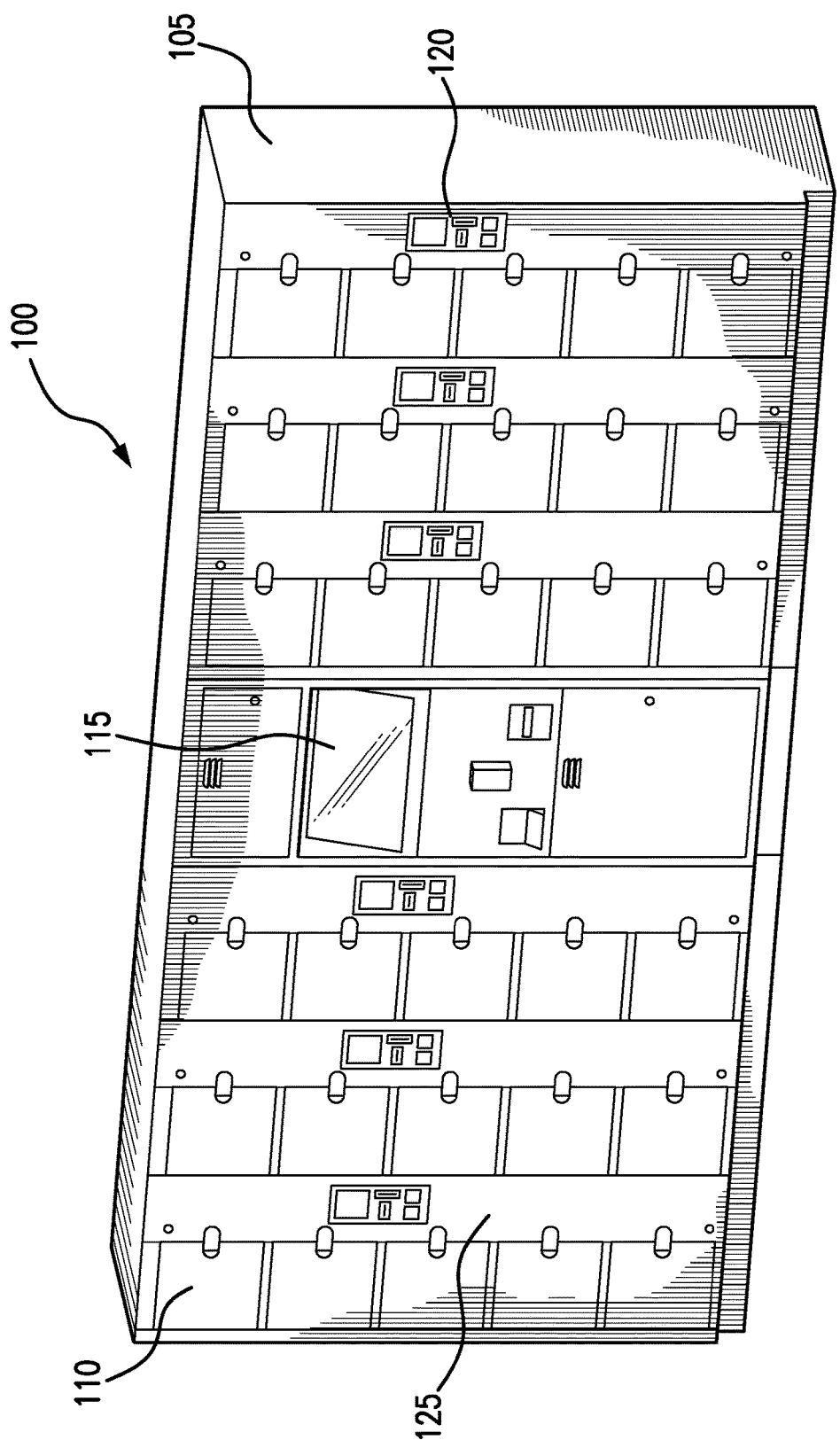
FIG. 1 is an illustration of an electronic storage system in accordance with the present invention.

Referring now to FIG. 1, there is seen an electronic storage system 100 according to the present invention. Electronic storage system 100 includes a system housing 105, a plurality of securable units 110, such as storage compartments 110, arranged in a matrix-like configuration of multiple columns, a kiosk 115 in electronic communication with storage compartments 110, and one or more user portals 120 disposed on rails 125 between the columns of storage compartments 110. Electronic storage system 100 is intended for use by customers at various entertainment venues, such as amusement and water parks, ski resorts, theatres and other venues where securable storage of customer property is desired. The system achieves this by enabling a customer to rent a storage compartment 110 for storage of personal belongings using kiosk 115 and/or user portals 120 and thereafter to controllably access the storage compartment 110 for a set duration using one or more of user portals 120.

Although embodiments described herein include securable units 110 in the form of storage compartments, it will be appreciated by those of skill in the art that securable units 110 may include other devices or features capable of being secured and/or assigned controllable access, such as, for example, strollers, shopping carts, appliances, rental equipment (such as surf boards and other recreational equipment), vending machines, etc.

Figure 2:
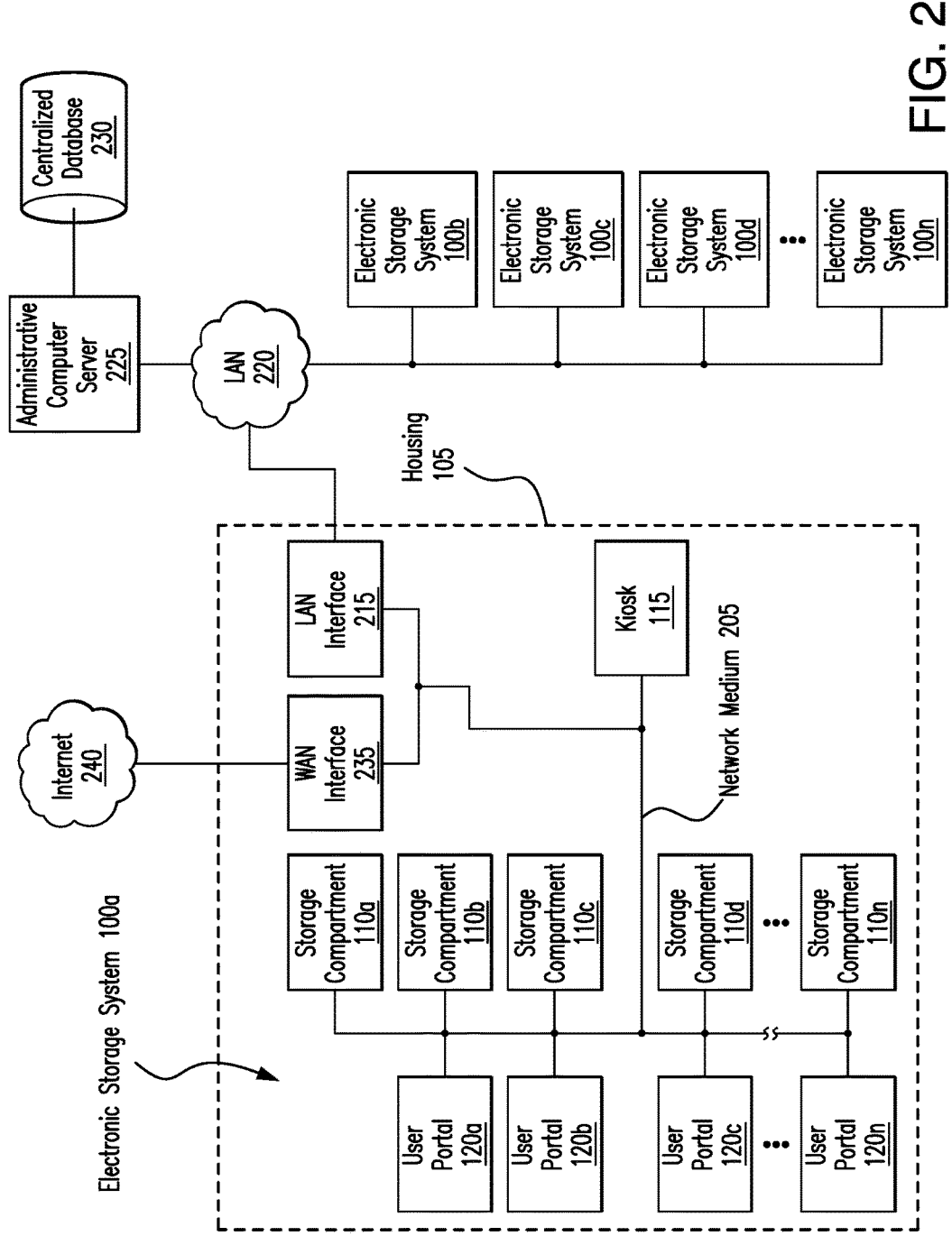
FIG. 2 is a diagram showing connectivity among various components of an electronic storage system in accordance with the present invention.

Referring now to FIG. 2, there is seen a diagram showing connectivity among various components of electronic storage system 100a in accordance with the present invention. As shown in FIG. 2, kiosk 115 communicates with user portals 120a, 120b, 120c, ... 120n via network medium 205. Network medium 205 may include any communication medium operable to permit electronic communications between kiosk 115 and user portals 120a, 120b, 120c, ... 120n, such as, for example, a wired Ethernet network, a wireless communication network (such as Wi-Fi or Bluetooth), direct conduit wiring, satellite, and/or any combination of these or other communication mediums. Kiosk 115 also communicates with storage compartments 110a, 110b, 110c, 110d, ... 110n via network medium 205 (as shown in FIG. 2) or via a separate communication medium, such as by direct conduit wiring connections between kiosk 115 and storage compartments 110a, 110b, 110c, 110d, ... 110n.

Electronic storage system 100a also includes a Local Area Network (LAN) interface 215 for connecting to a Local Area Network (LAN) 220. Local Area Network (LAN) 220 permits multiple electronic storage systems 100a, 100b, 100c, 100d, ... 100n to be networked together, for example, when multiple electronic storage systems 100a, 100b, 100c, 100d, ... 100n are installed at different locations throughout a venue. Similar to network medium 205, local Area Network (LAN) 220 may include any communication medium operable to permit electronic communications between systems 100a, 100b, 100c, 100d, ... 100n. An administrative computer server 225 and associated centralized database 230 are also connected to Local Area Network (LAN) 220 for permitting centralized control of administrative functions and for managing rental transfers or "floating rentals" among electronic storage systems 100a, 100b, 100c, 100d, ... 100n, as more full described below.

Electronic storage system 100a also includes a Wide Area Network (WAN) interface 235 for connecting to a Wide Area Network (WAN) 240, such as the Internet. Connectivity to the Internet permits authorized personnel (such as administrative and maintenance personnel) to access administrative and other functions of electronic storage system 100a remotely. In one embodiment, Internet connectivity also permits customers to reserve and/or rent one or more storage compartments 110a, 110b, 110c, 110d, ... 110n remotely using a suitably designed software application resident on a personal computer or smart device, such as a smartphone or tablet. It will be appreciated by those skilled in the art that Local Area Network (LAN) interface 215 and Wide Area Network (WAN) interface 235 may reside within housing 105 of electronic storage system 100a (as shown in FIG. 2) or, alternatively, may reside elsewhere, for example, within kiosk 115.

Figures 3A, 3B:
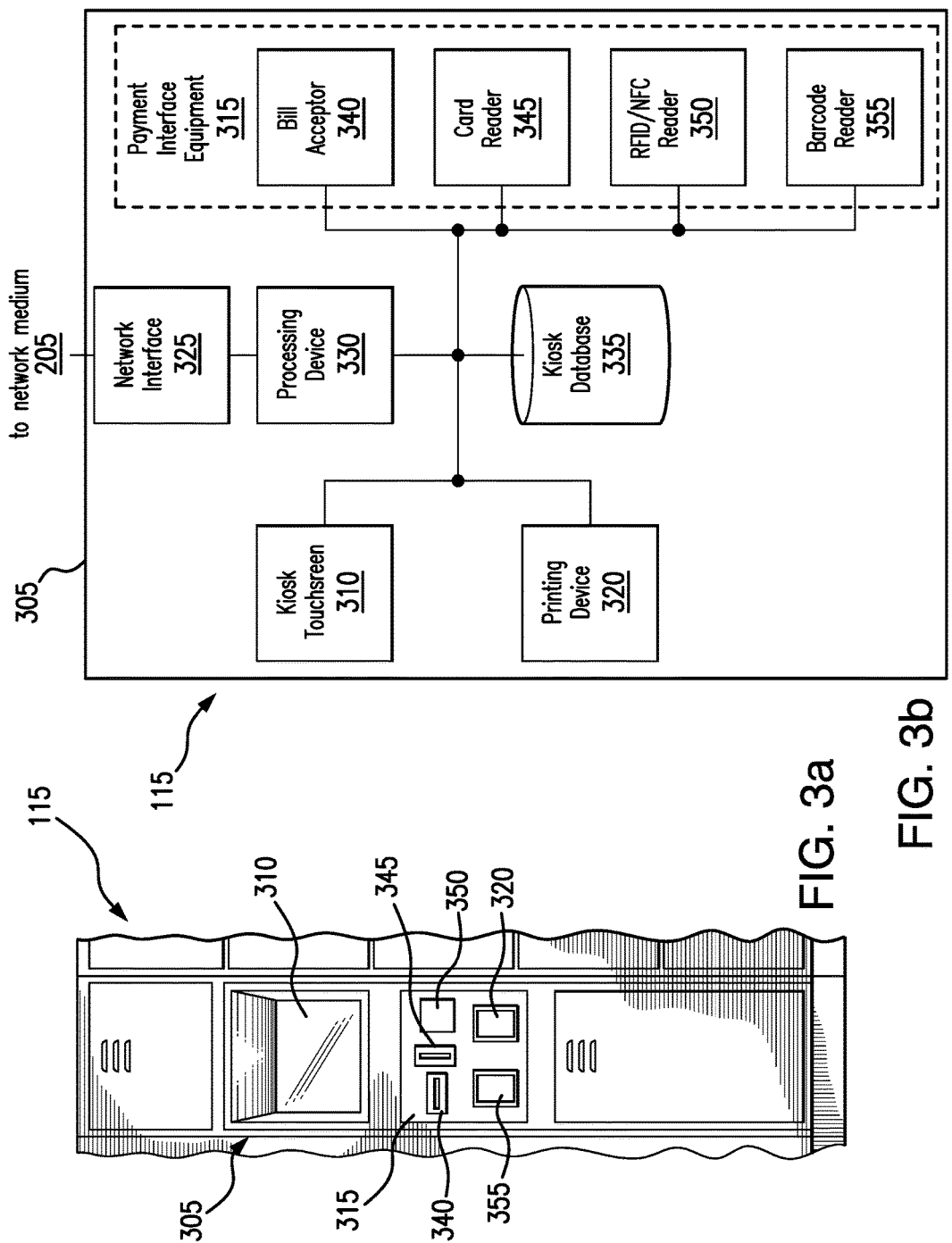
FIG. 3a is an illustration of a kiosk in accordance with the present invention.
FIG. 3b is a diagram showing connectivity among various components of a kiosk in accordance with the present invention.

Referring now to FIGS. 3a and 3b, there is seen a kiosk 115 in accordance with the present invention. Kiosk 115 is operable to permit authorized users (including customers and administrative personnel) to rent and/or access one or more storage compartments 110, transfer or "float" a rental among multiple electronic storage systems 100, and perform various administrative functions.

Administrative functions include, for example, functions that permit administrators to generate (and email to authorized individuals) various reports, such as sales records, usage reports, and error reports. These functions also permit administrators, among other things, to execute various hardware and software tests, unlock and open one or more storage compartments 110, change the personal identification code associated with one or more storage compartments 110, disable one or more storage compartments 110, end a compartment rental, reassign a rental to a different storage compartment 110, grant access to a storage compartment 110 free of charge, and restart the system. These administrative functions are also accessible over the LAN 220 or the Internet using a web portal.

Kiosk 115 includes a kiosk housing 305, a user interface, such as kiosk touchscreen 310, for presenting information to and receiving inputs from a user, payment interface equipment 315 for accepting various forms of payment, such as credit cards, debit cards, cash, etc., printing device 320 for printing paper receipts, network interface 325 (such as an Ethernet interface) for connecting kiosk 115 to network medium 205 of electronic storage system 100, processing device 330 for processing rental, access, transfer and administrative functions, and a kiosk database 335.

Processing device 330 consists of hardware and/or software operable to enable rental, access, transfer and administrative functions of electronic storage system 100. For this purpose, processing device 330 may include a general purpose computer or other off-the-shelf components executing appropriate software or, alternatively, may include special purpose hardware and/or software. In one embodiment, processing device 330 consists of a rack mounted personal computer (PC) operable to execute specially designed software for performing all kiosk functions. It will be appreciated, however, that various embodiments of the present invention are not intended to be limited to any particular processing hardware and/or software.

Payment interface equipment 315 includes components that enable kiosk 115 to accept one or more forms of payment for renting storage compartments 110. In one embodiment, payment interface equipment 315 includes bill acceptor 340 for accepting payment in the form of cash or other negotiable instruments, card reader 345 (which may include an EMV chip reader) for retrieving payment and related information from credit and debit cards, a Radio Frequency Identification Device (RFID)/Near Field Communication (NFC) reader 350 for retrieving payment and related information from various RFID/NFC devices, such as from a transponder embedded within a wristband provided by the venue at which electronic storage system 100 is installed or from an NFC-enabled smartphone/tablet running, e.g., Apple Pay or Android Pay, and/or barcode reader 355 for retrieving payment and other information from a barcode, such as, for example, a barcode imprinted on a wristband, receipt or other medium.

Figures 4A, 4B:
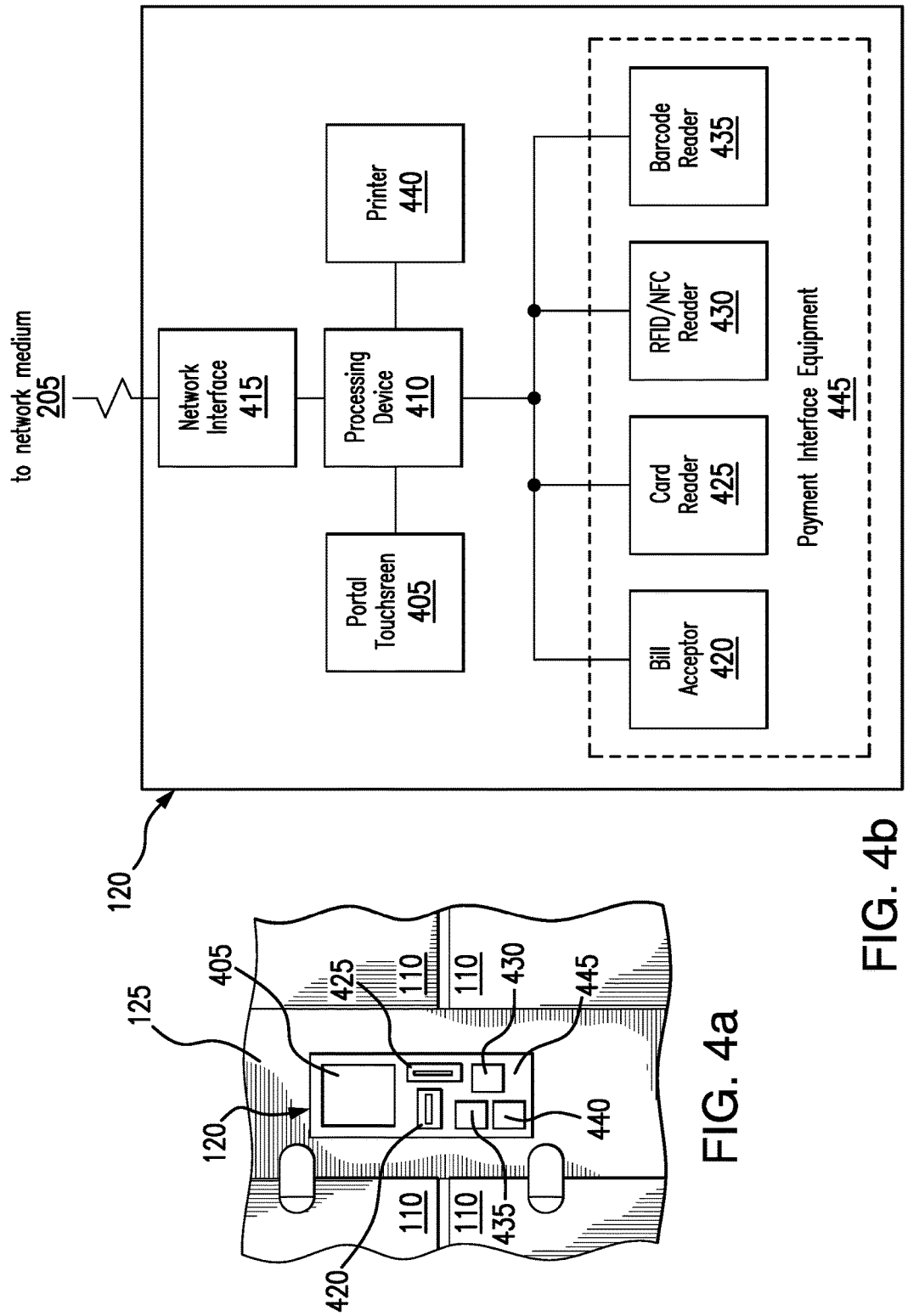
FIG. 4a is an illustration of a user portal in accordance with the present invention.
FIG. 4b is a diagram showing connectivity among various components of a user portal in accordance with the present invention.

Referring now to FIGS. 4a and 4b, there is seen a user portal 120 according to the present invention. User portal 120 enables a user to access one or more storage compartments 110 after being rented. For this purpose, user portal 120 includes a portal interface, such as touchscreen 405, for presenting information to and receiving inputs from a user, a processing device 410 coupled to portal touchscreen 405 and a network interface 415 (such as an Ethernet interface) for coupling user portal 120 to network medium 205. In one embodiment, portal touchscreen 405, processing device 410 and network interface 415 may be replaced by a smart device, such as a smartphone or tablet executing a special purpose software application. In this embodiment, the smart device is installed within rail 125 and communicates with kiosk 115 wirelessly via network medium 205 or another appropriate medium.

In other embodiments, user portal 120 is operable to also perform rental functions and manage locker transfer or "floating rentals" among multiple electronic storage systems 100, similar to kiosk 115. For this purpose, user portal 120 may be provided with payment interface equipment 445 and other equipment similar to that provided in kiosk 115, including bill acceptor 420, card reader 425, RFID/NFC reader 430, barcode reader 435 and/or printer 440.

Figure 5:
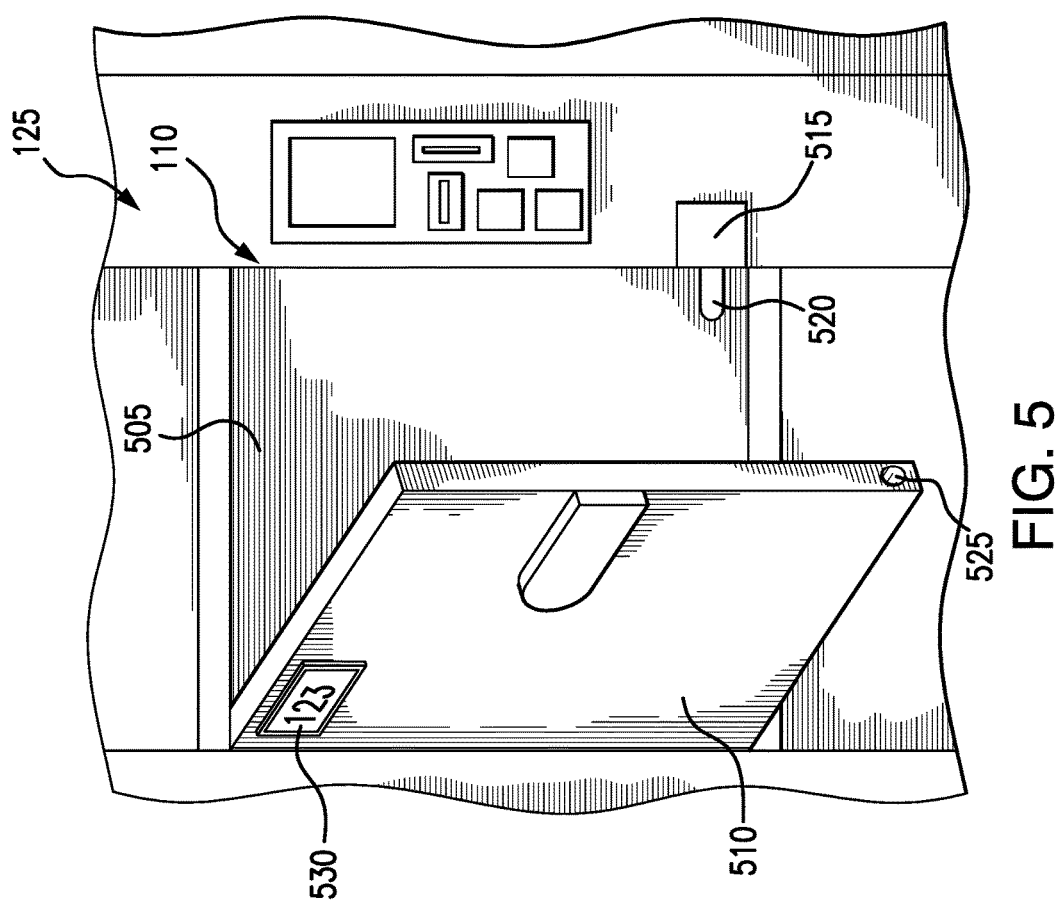
FIG. 5 is an illustration of a storage compartment in accordance with the present invention.
Figure 11:
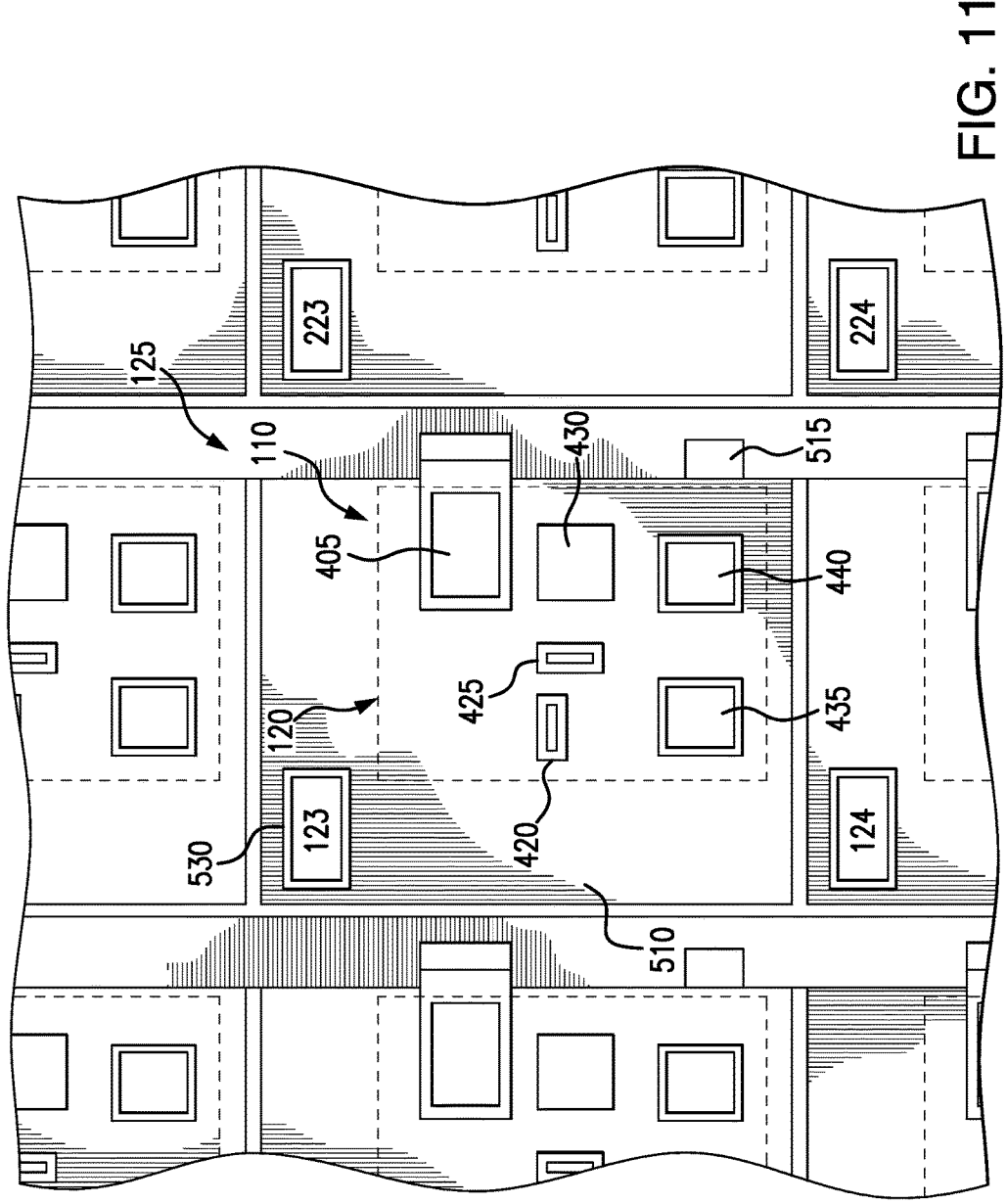
FIG. 11 is an illustration of another storage compartment in accordance with the present invention.

Referring now to FIG. 5, there is seen an exemplary storage compartment 110 according to the present invention. Various different sized storage compartments 110 (e.g., small, medium, large and extra-large) may be included within electronic storage system 100. Each compartment 110 includes a cubicle 505 for storing customer belongings, a door 510 for securing cubicle 505, a compartment identifier 530 (e.g., an ID number or other information uniquely identifying storage compartment 110) and an electronic locking mechanism 515 positioned within rail 125 alongside and adjacent to door 510 of cubicle 505 (in other embodiments, locking mechanism 515 is positioned on or within door 510). When door 510 is closed, locking mechanism 515 automatically secures cubicle 505 by engaging a pin 520 within an associated receptacle 525 of door 510 (or a receptacle within rail 125, in the event locking mechanism 515 is positioned on or within door 510), thereby securing door 510 firmly against rail 125 in a closed and secure position. When electronically controlled to unlock (via kiosk 115), locking mechanism 515 retracts pin 520 and opens door 510, thereby allowing access to cubicle 505. FIG. 11 illustrates an alternative embodiment of storage compartment 110 having a user portal installed thereon.

Figure 6:
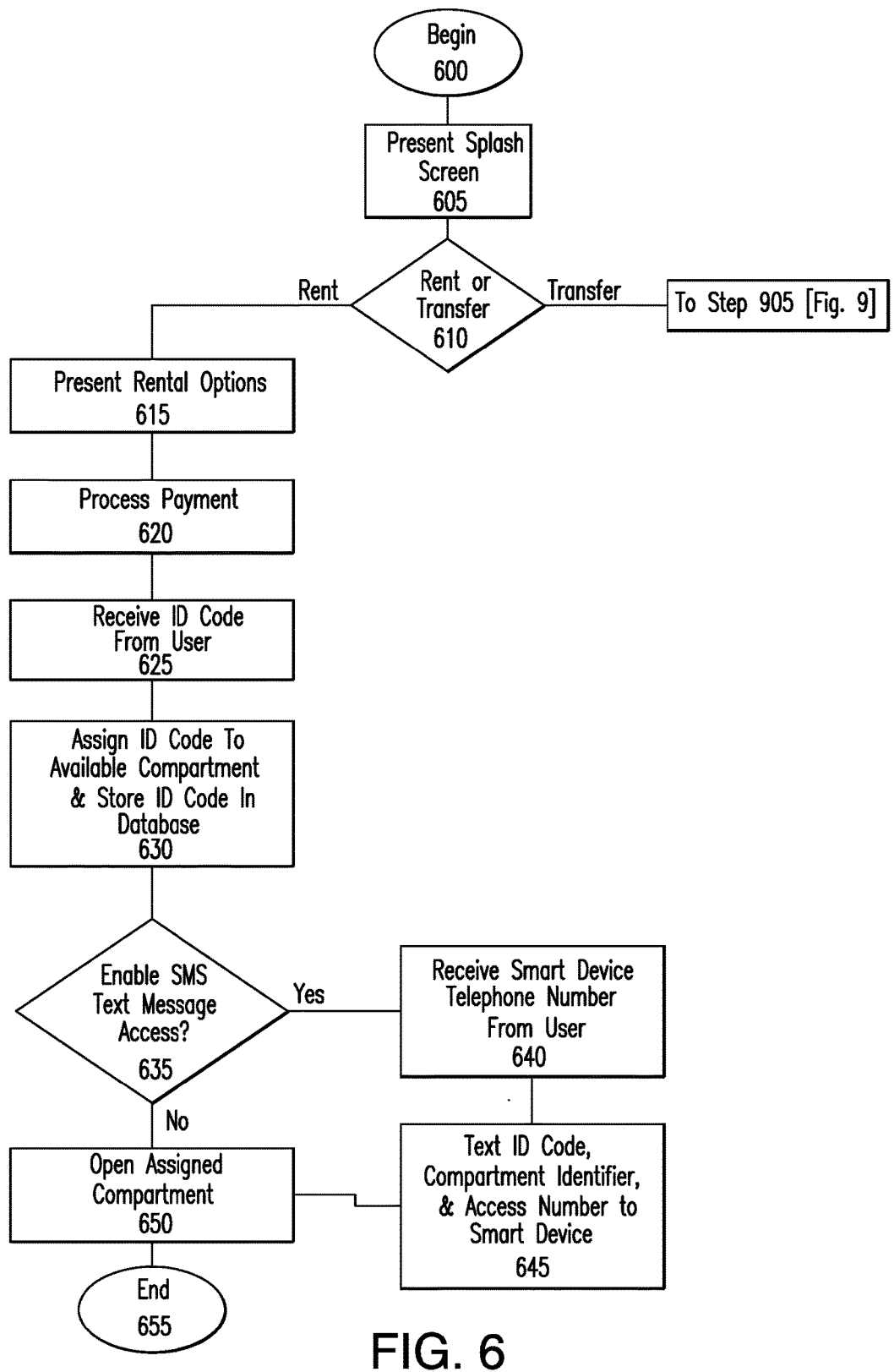
FIG. 6 is a flow diagram detailing a process for renting a storage compartment in accordance with the present invention.

Referring now to FIG. 6, there is seen a flow chart detailing a process for renting a storage compartment 110 using kiosk 115. The process beings at step 600 and proceeds to step 605, where a user is presented with an introductory splash screen via touchscreen 310. The splash screen displays various information to the user, such as information relevant to the venue at which electronic storage system 100 is installed. The splash screen, or other screen presented to the user during the rental process, may also display appropriate terms and conditions, such as when electronic storage system 100 is configured as a "ride" system operable to offer free compartment rentals for limited periods of time.

After exiting the splash screen, the user is prompted at step 610 to either rent a new storage compartment 110 or transfer an existing rental to another storage compartment 110 at a different location within the venue. If the user selects the option to transfer an existing rental, the process proceeds to step 905 of FIG. 9 (described below).

Figure 7:
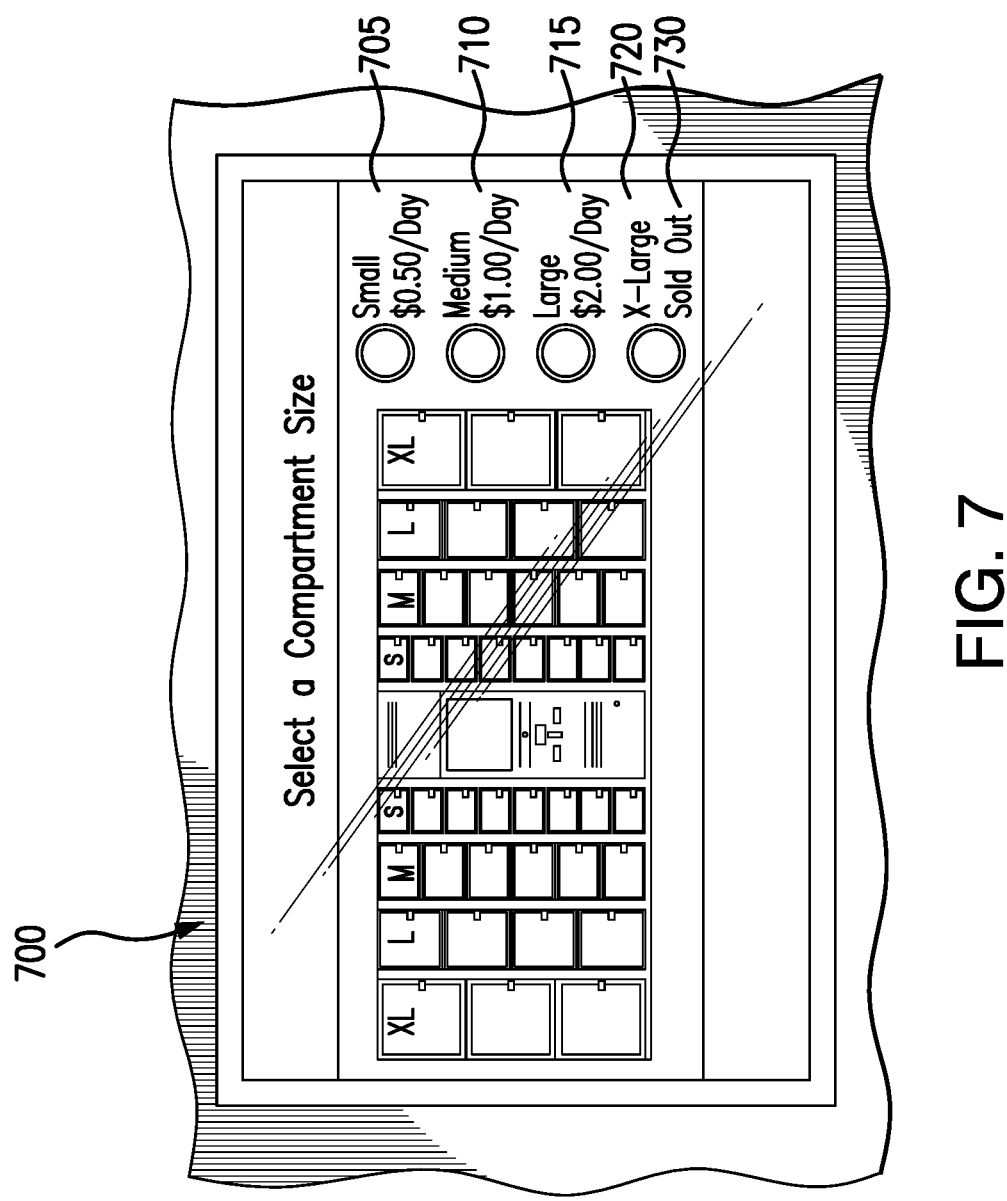
FIG. 7 is a display showing compartment size options in accordance with the present invention.

Alternatively, if the user selects the option to rent a new storage compartment 110, the process proceeds to step 615 where the user is presented with various options associated with the rental of storage compartment 110. In one embodiment, the user is presented with a display 700 on touchscreen 310 (see FIG. 7) showing options permitting him/her to select a desired size (e.g., small 705, medium 710, large 715 or extra-large 720) for a storage compartment 110 to be rented. As shown in FIG. 7, size options correlate to respective prices for available compartments, whereas options for unavailable sizes are not presented or, alternatively, are presented in a non-selectable form (e.g., greyed out) with a suitable message, such as "Sold Out" message 730. Size options provide flexibility by permitting the user to select an amount of storage commensurate with his/her needs at a particular time. For example, an individual wishing to store only one or a few items may select a small compartment, whereas a larger compartment may be selected to accommodate bulky items or belongings of multiple individuals.

Figure 8:
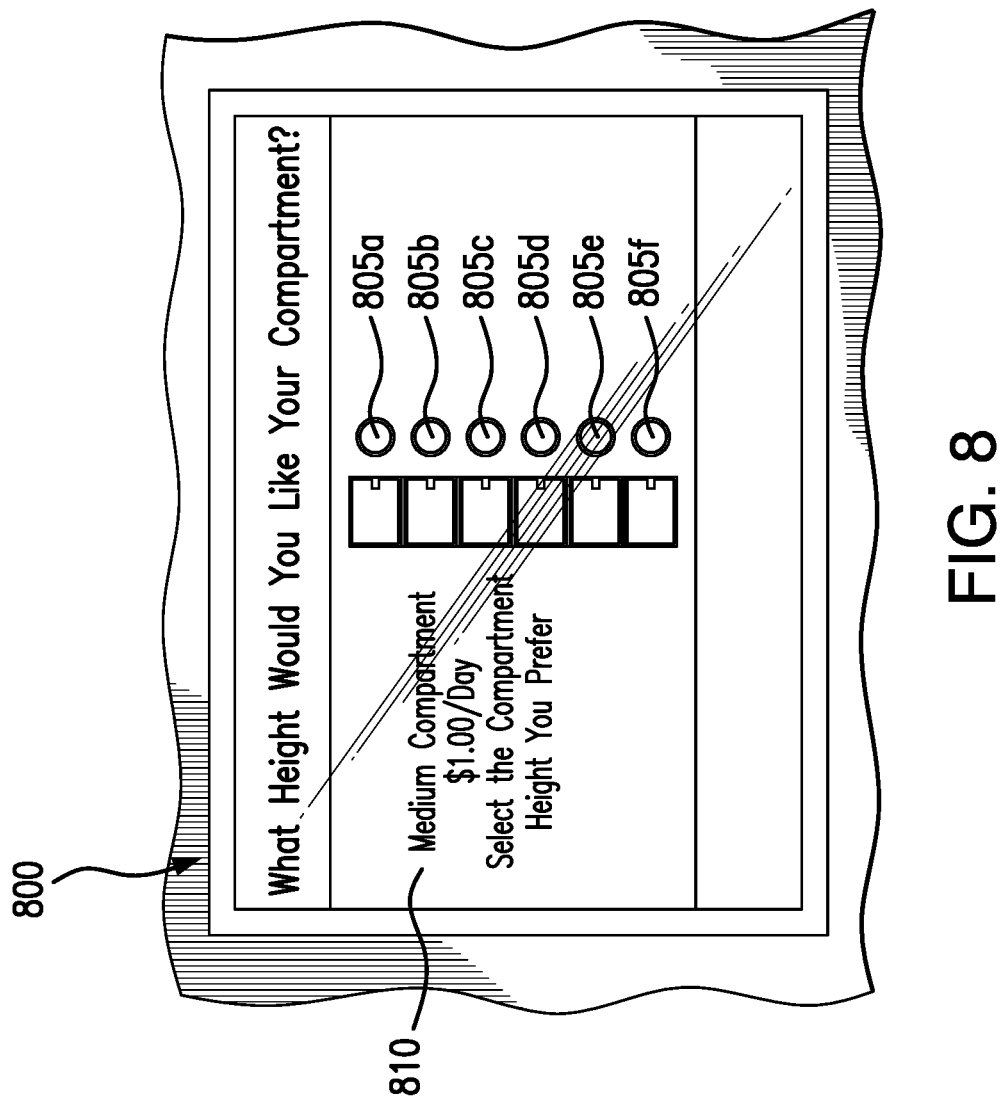
FIG. 8 is a display showing vertical location options for compartments in accordance with the present invention.

In another embodiment, the user is also presented with a display 800 (see FIG. 8) showing options 805a, 805b, 805c, . . . 805f permitting him/her to select a desired vertical location (or height) of storage compartment 110, if available. Height options 805a, 805b, 805c, . . . 805f are presented in accordance with the compartment size option 810 selected by the user (e.g., medium 710). In this manner, the user can ensure comfortable access of the assigned storage compartment 110 based on preferences and attributes, such as the height of the user, physical disabilities, etc. The user may also be presented with options permitting him/her to select the duration of the rental and/or to select a fixed price, to which the electronic storage system 100 assigns a rental duration. For example, in one embodiment, the user is presented with options permitting him/her to select a number of hours to rent storage compartment 110 or a multi-day rental, whereby the user can select a number of days to rent storage compartment 110.

After selecting various options associated with the rental, the process proceeds to step 620 where the user is presented with payment options for renting storage compartment 110.

As described above, kiosk 115 of electronic storage system 100 is configured to accept various forms of payment, such as cash, credit cards, debit cards, and payments via RFID/NFC devices and barcodes (some embodiments may omit one or multiple forms of payment or offer locker access free of charge). In the event the user pays with a credit or debit card or RFID/NFC device, kiosk 115 processes and verifies payment over the Internet (via network interface 325, network medium 205 and WAN interface 235) using standard processing communications with appropriate clearing houses.

After or during payment verification, the user is prompted at step 625 to input and verify access credentials for accessing the assigned storage compartment 110 during the rental period. In one embodiment, the access credentials include a personal identification code (such as a 4-digit identification code or alphanumeric password). For security, mask characters, such as "XXXX" or "****", may hide the identification code from view upon entry. In an alternative embodiment, identification codes are randomly generated by kiosk 115. In yet another embodiment identification codes are replaced by codes scanned from a wristband or from and RFID and/or NFC device provided to the user.

After the user inputs and verifies his/her personal identification code, the process proceeds to step 630. At this step, kiosk 115 assigns the personal identification code to an available storage compartment 110 consistent with the size and height preferences selected by the user. Kiosk 115 then stores in kiosk database 335 the personal identification code and compartment identifier 530 associated with the assigned storage compartment 110. In an alternative embodiment, such as an embodiment permitting compartment rental transfers or "floating rentals," the personal identification code and compartment identifier 530 are stored in centralized database 230 associated with administrative computer server 225 (see FIG. 2). For this purpose, kiosk 115 transmits the personal identification code and compartment identifier 530 to administrative computer server 225 via network interface 325, network medium 205 and LAN interface 215.

After the personal identification code and compartment identifier 530 are stored in kiosk database 335 (or centralized database 230), the process proceeds to step 635, where the user is provided with an option to enable text or SMS messaging functionality for compartment access. This option allows a user to access an assigned storage compartment 110 by texting or SMS messaging his/her personal identification code and compartment identifier 530 from a smart device, such as a smartphone or tablet, to a telephone number assigned to electronic storage system 100.

If the user opts not to enable text or SMS messaging functionality, the process proceeds to step 650. Alternatively, if the user elects to enable text or SMS messaging, the process proceeds to step 640, where kiosk 115 prompts the user to enter a telephone number of a smart device (e.g., a smartphone or tablet). After the telephone number is entered, kiosk 115 "registers" the telephone number by correlating it to compartment identifier 530 associated with the assigned storage compartment 110 and storing it in kiosk database 335 or centralized database 230.

The process then proceeds to step 645. At this step, kiosk 115 texts or messages the user's personal identification code, compartment identifier 530, and an access telephone number to the user's smart device. In one embodiment, the kiosk is also configured to re-transmit the personal identification code and compartment identifier 530 in the event the user forgets or misplaces one or both pieces of information. To initiate the retransmission, the user re-enters his/her smart device telephone number into kiosk 115 in accordance with retrieval options presented to the user via kiosk 115. If the telephone number entered by the user matches the one stored at step 640, kiosk 115 re-transmits the personal identification code and compartment identifier 530 to the user's smart device.

The text or SMS message may be sent in a conventional and well known manner via a cellular network or, alternatively, via the Internet using network interface 325, network medium 205, and WAN interface 235. In the event Internet communication is employed, the text or SMS message may be converted using any of a number of online vendors which offer Internet-to-SMS messaging capability (or vice versa) or by a software application executing, for example, on a centralized server connected to the Internet. In another embodiment, the information to be included in the text or SMS message is communicated via email to a server or other centralized computing device, which converts the email into a text or SMS message.

The process then proceeds to step 650. At this step, kiosk 115 unlocks and opens the assigned storage compartment 110 by controlling the associated locking mechanism 515 of the compartment and communicates compartment identifier 530 and the rental time to the user via touchscreen 310. This information may also be provided to the user via a receipt, which may be printed via printing device 320 and/or emailed to the user.

After the rental process is completed at step 655, the user locates the assigned storage compartment 110 using compartment identifier 530 provided by kiosk 115. An indicator light (not shown) on or adjacent to door 510 of compartment 110 may provide a visual indication to aid the user in locating the assigned storage compartment 110. After the user locates and places his/her personal belongings in the assigned storage compartment 110, the compartment is secured by closing door 510, which automatically engages the associated locking mechanism 515 within rail 125. The user may then access the assigned storage compartment 110 during the rental period by entering the personal identification code and compartment identifier 530 into kiosk 115 in accordance with a compartment access process.

In embodiments employing text or SMS messaging access, the user may access the assigned storage compartment 110 also by texting or SMS messaging his/her personal identification code and compartment identifier 530 to the access telephone number assigned to electronic storage system 100.

In an alternative embodiment, the rental process described above with respect to FIG. 6 may be performed using one or more user portals 120. In this embodiment, user preferences, such as preferences regarding locker size and vertical location, payment information, and the personal identification code are received from the user via portal touchscreen 405 and payment interface equipment 445 of a user portal 120. User portal 120 then transmits this information to kiosk 115 via network interface 415 and network medium 205. Next, kiosk 115 verifies payment, assigns the personal identification code to an available storage compartment 110, and stores the identification code and associated compartment identifier 530 in kiosk database 335 or centralized database 230. Kiosk 115 then unlocks the assigned storage compartment 110 and transmits the associated compartment identifier 530 to user portal 120, where it and other information verifying the rental are displayed to the user via portal touchscreen 405. This information may also be provided to the user via a receipt, which may be printed via portal printer 440 and/or emailed to the user.

In another embodiment, the rental process described above with respect to FIG. 6 may be performed using a smart device, computer, NFC device, or website portal executing a suitably designed application. In this embodiment, rental functions are presented to the user via the application. User inputs, such as locker size, height, credit card information, etc., are then communicated by the application to electronic storage system 100 via the Internet or other medium. In another embodiment, the user performs the rental process by communicating rental options, credit card information, etc. to electronic storage system 100 via text or SMS messaging.

In an alternative embodiment, processing for payment verification and rental functions are performed directly by user portal 120 without involvement from kiosk 115. In yet another embodiment, processing for payment verification and rental functions are performed by a remote computer, such as administrative computer server 225, which is in communication with user portal 120 (or kiosk 115 in the event kiosk 115 is used for performing the rental process).

Figure 9:
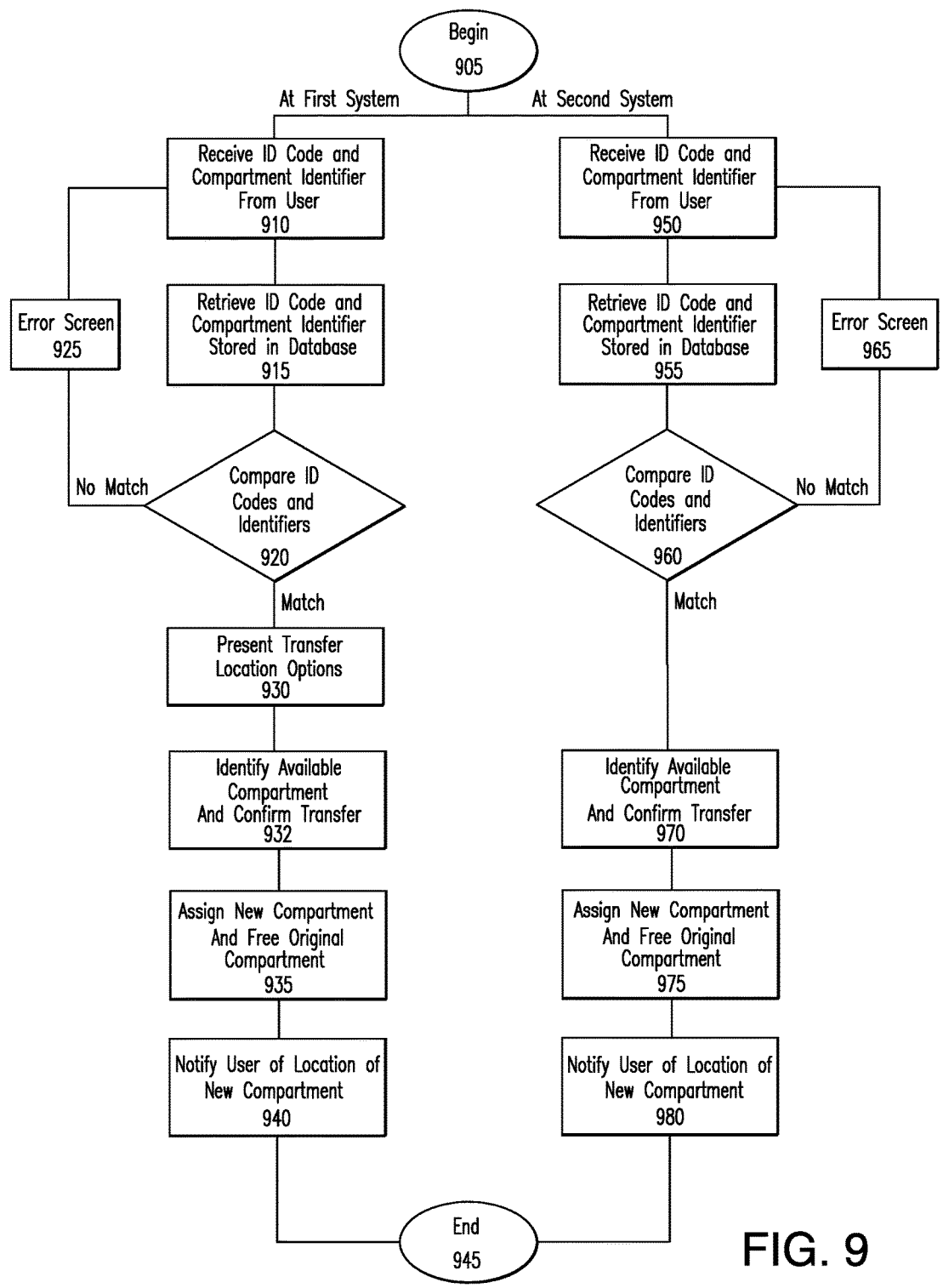
FIG. 9 is a flow diagram detailing a process for transferring a storage compartment rental in accordance with the present invention.

Referring now to FIG. 9, there is seen a process for transferring a rental of a storage compartment 110 to another location in accordance with the present invention. Rental transfers may be desired in situations where a venue installs multiple electronic storage systems 100 at various different locations throughout the venue. In such a case, a user who rents a storage compartment 110 at one location within a venue, but visits multiple locations throughout a visit, may be inconvenienced by having to return to the same location each time he/she wishes to access storage compartment 110. An embodiment of the present invention addresses this concern by permitting rental transfers or "floating" rentals that enable a user to transfer a storage compartment rental from one electronic storage system 100 to another system 100 installed at a different location within the same venue.

A user initiates a rental transfer process from a first electronic storage system 100$x$ to a second storage system 100$y$ using kiosk 115 of either the first or second systems 100$x$, 100$y$. After receiving the splash screen and selecting the option to transfer an existing rental (see steps 605, 610 of FIG. 6), the locker transfer process starts at step 905.

If the user initiates the rental transfer using kiosk 115 of the first electronic storage system 100$x$, the process proceeds to step 910, where the user is prompted for his/her personal identification code and compartment identifier 530 associated with and displayed on the assigned storage compartment 110.

The rental transfer process then proceeds to step 915, where kiosk 115 retrieves the personal identification code and compartment identifier 530 that were stored previously in the centralized database 230 and/or kiosk database 335 during a rental process, such as the rental process described with respect to FIG. 6.

The process then proceeds to step 920, where kiosk 115 compares the retrieved identification code and compartment identifier 530 with the code and identifier 530 entered by the user at step 910. If the identification codes and/or compartment identifiers 530 do not match, the process proceeds to step 925, where the user is presented with an error screen. The process then proceeds to step 910, where the user is re-prompted for his/her personal identification code and compartment identifier 530.

If the comparison of step 920 results in a match, the process proceeds to step 930, where the user is presented with a screen prompting him/her to select a location within the venue to which the rental will be transferred. Location options are presented as a text-based list of areas within the venue or as a map of locations.

After the user selects a new location for the rental, the process proceeds to step 932. At this step, kiosk 115 communicates with administrative computer server 225 over LAN 220 to identify an available electronic storage system 100 (in this example, second electronic storage system 100$y$) and storage compartment 110 at the new location meeting the size and height requirements of the original rental. In another embodiment, the user is provided with the ability to reselect compartment options, such as the size and height preferences of a new storage compartment 110. Once a suitable compartment 110 is located, kiosk 115 requests the user to confirm the transfer and informs him/her that access to the originally assigned storage compartment 110 will be withdrawn upon transfer.

After the user confirms the transfer, the transfer process proceeds to step 935, where administrative computer server 225, interacting with centralized database 230 and/or kiosk database 335, reassigns the user's personal identification code to new storage compartment 110 of the second electronic storage system 100$y$ and frees the originally assigned storage compartment 110 for subsequent rental.

At step 940, kiosk 115 of the first electronic storage system 100$x$ communicates the location of new storage compartment 110 and associated compartment identifier 530 to the user. This information may also be provided on a receipt emailed to the user and/or printed by printing device 320 of kiosk 115 upon completion of the transfer process. The transfer process then ends at step 945.

If the user initiates the rental transfer using kiosk 115 of the second electronic storage system 100$y$, the process proceeds from step 905 to step 950, where the user is prompted for his/her personal identification code and compartment identifier 530 associated with and displayed on the assigned storage compartment 110 of the first electronic storage system 100$x$.

The rental transfer process then proceeds to step 955, where kiosk 115 retrieves the personal identification code and compartment identifier 530 that were stored previously in centralized database 230 and/or kiosk database 335 of the first electronic storage system 100 during a rental process, such as the rental process described with respect to FIG. 6.

The process then proceeds to step 960, where kiosk 115 compares the retrieved identification code and compartment identifier 530 with the code and identifier 530 entered by the user at step 950. If the identification codes and/or compartment identifiers 530 do not match, the process proceeds to step 965, where the user is presented with an error screen. The process then proceeds to step 950, where the user is re-prompted for his/her personal identification code and compartment identifier 530 associated with and displayed on the originally assigned storage compartment 110.

If the comparison of step 960 results in a match, the process proceeds to step 970. At this step, kiosk 115 communicates with administrative computer server 225 over LAN 220 to identify an available storage compartment 110 of the second electronic storage system 100$y$ meeting the size and height requirements of the original rental. In another embodiment, the user is provided with the ability to reselect compartment options, such as the size and height preferences of a new storage compartment 110. Once a suitable compartment is located, kiosk 115 requests the user to confirm the transfer and informs him/her that access to the originally assigned storage compartment 110 of the first electronic storage system 100$x$ will be withdrawn upon transfer.

After the user confirms the transfer, the transfer process proceeds to step 975, where administrative computer server 225, interacting with centralized database 230 (or kiosk database 335), reassigns the user's personal identification code to new storage compartment 110 of the second electronic storage system 100y and frees the originally assigned storage compartment 110 for subsequent rental.

At step 980, kiosk 115 of the second electronic storage system 100 communicates the compartment identifier 530 associated with new storage compartment 110 to the user. This information may also be provided on a receipt emailed to the user and/or printed by printing device 320 of kiosk 115 upon completion of the transfer process. The transfer process then ends at step 945.

After the transfer process is completed, the user locates the newly assigned storage compartment 110 of the second electronic storage system 100y. An indicator light (not shown) on or adjacent to the new storage compartment 110 may provide a visual indication to aid the user in locating the new storage compartment 110. After the user locates and places his/her personal belongings in the new storage compartment 110, compartment 110 is secured by closing door 510, which automatically engages the associated locking mechanism 515 within rail 125. The user may then access the new storage compartment 110 anytime during the rental period.

In an alternative embodiment, the locker transfer process described with respect to FIG. 9 may be performed by one or more user portals 120 of either the first or second electronic storage systems 100x, 100y. In yet another embodiment, the personal identification codes used in the rental transfer process are replaced with codes scanned from wristbands or from RFID/NFC devices assigned to the users.

Figure 10:
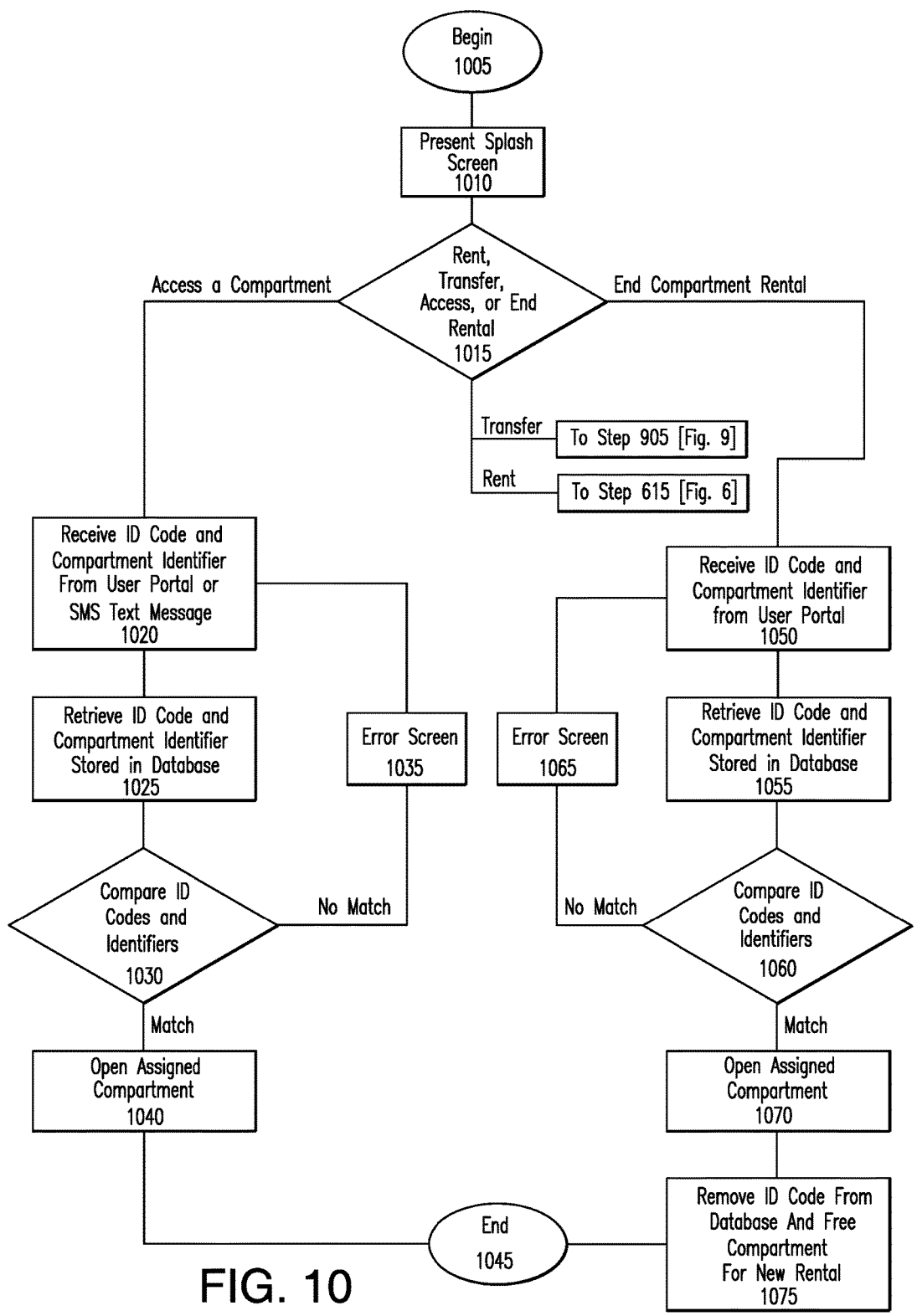
FIG. 10 is a flow diagram detailing a process for accessing and ending a rental of an assigned storage compartment in accordance with the present invention.

Referring now to FIG. 10, there is seen a process for accessing and ending a rental of an assigned storage compartment 110 using one or more user portals 120. The process beings at step 1005 and proceeds to step 1010, where the user is presented with a splash screen similar to or different than the one presented to the user at step 605 of the rental process. After exiting the splash screen, the process proceeds to step 1015, where the user is presented with options to (i) rent a storage compartment 110; (ii) transfer a rented storage compartment 110 to another location; (iii) access/continue a rented storage compartment 110; or (iv) end a rental.

If the user selects the option to rent a storage compartment, the process proceeds to step 615 of FIG. 6 where the user is presented with various options associated with the rental of a storage compartment 110. If the user selects the option to transfer a rental, the process proceeds to step 905 of FIG. 9, where the user is prompted to initiate a rental transfer.

If the user selects the option to access a rented storage compartment 110, the process proceeds to step 1020, where the user is prompted via portal touchscreen 405, to enter the compartment identifier 530 and personal identification number associated with the assigned storage compartment 110. This information is then transmitted by user portal 120 to kiosk 115 via network interface 415 and network medium 205.

In an alternative embodiment, the user may access a storage compartment 110 using a credit card reader installed on door 510 of a rented compartment 110 (such as card reader 425 of user portal 120 with respect to embodiments having user portals 120 installed on individual doors 510 of storage compartments 110). In this embodiment, the user's credit card information is first stored in kiosk 115 during a rental process and correlated to the rented storage compartment 110. The user then accesses the rented storage compartment 110 by swiping or inserting his/her credit card into the credit card reader on the rented compartment 110. The credit card information retrieved by the card reader is then transmitted to kiosk 115 and compared to the credit card information stored during the rental process. In the event of a match, kiosk 115 unlocks and permits access to the rented storage compartment 110.

In an alternative embodiment, the user may utilize a smart device, such as a smart phone or tablet, to text or SMS message the compartment identifier 530 and personal identification number to an access telephone number assigned to electronic storage system 100 and transmitted to the user's smart device during a compartment rental process, such as the rental process described with respect to FIG. 6. In this embodiment, kiosk 115 receives the text or SMS message from a conventional cellular network or, alternatively, via the Internet using network interface 325, network medium 205, and WAN interface 235. In the event Internet communication is employed, the text or SMS message may be converted using any of a number of online vendors which offer Internet-to-SMS messaging capability (and vice versa) or by a software application executing, for example, on a centralized server connected to the Internet.

In still another embodiment, kiosk 115 retrieves the smart device's telephone number from a conventional caller-ID signal transmitted with the text or SMS message. The retrieved telephone number is compared with the smart device telephone number correlated with compartment identifier 530 and stored in kiosk database 335 or centralized database 230 during a compartment rental process, such as the rental process described with respect to FIG. 6. If the telephone numbers do not match, kiosk 115 disregards the text or SMS message. This embodiment provides additional security by requiring that a text or SMS message for accessing an assigned storage compartment 110 be transmitted from the smart device telephone number registered with kiosk 115 during the rental process.

In yet another embodiment, the user need only text or SMS message the personal identification code. In this embodiment, kiosk 115 uses the smart device's telephone number retrieved from caller-ID to lookup the compartment identifier 530 associated with the assigned storage compartment 110.

The process then proceeds to step 1025, where kiosk 115 retrieves the personal identification code and compartment identifier 530 that were stored previously in centralized database 230 and/or kiosk database 335 during the rental process.

The process then proceeds to step 1030, where kiosk 115 compares the retrieved identification code and compartment identifier 530 with the code and identifier 530 entered by the user at step 1020. If the identification codes and/or compartment identifiers 530 do not match, the process proceeds to step 1035, where kiosk 115 transmits information indicative of the mismatch to user portal 120, which may then present the user with an error message (such as "Incorrect Code" or other suitable message) via portal touchscreen 405. The process then proceeds to step 1020, where the user is re-prompted for his/her personal identification code and compartment identifier 530.

If the codes match, the process proceeds to step 1040. At this step, kiosk 115 communicates information indicative of the match to user portal 120, which may then present the user with a message such as "success" or other suitable message informing the user that a match has occurred. In the event of a match, kiosk 115 also transmits an unlock signal to the locking mechanism 515 associated with the assigned storage compartment 110, thereby causing door 510 of the assigned storage compartment 110 to unlock and open automatically to permit access thereto. The process then ends at step 1045.

After the access process is completed, the user locates the assigned storage compartment 110 using compartment identifier 530. An indicator light (not shown) on or adjacent to door 510 of compartment 110 may provide a visual indication to aid the user in locating the assigned storage compartment 110. After the user locates and places his/her personal belongings in the assigned storage compartment 110, the compartment is secured by closing door 510, which automatically engages the associated locking mechanism 515 within rail 125.

If the user selects the option to end a rental at step 1015, the process proceeds to step 1050. At this step, the user is prompted via portal touchscreen 405 to enter the compartment identifier 530 and personal identification number associated with the assigned storage compartment 110. This information is then transmitted by user portal 120 to kiosk 115 via network interface 415 and network medium 205.

The process then proceeds to step 1055, where kiosk 115 retrieves the personal identification code and compartment identifier 530 that were stored previously in centralized database 230 and/or kiosk database 335 during the rental process.

The process then proceeds to step 1060, where kiosk 115 compares the retrieved identification code and compartment identifier 530 with the code and identifier 530 entered by the user at step 1050. If the identification codes and/or compartment identifiers 530 do not match, the process proceeds to step 1065, where kiosk 115 transmits information indicative of the mismatch to user portal 120, which may then present the user with an error message (such as "Incorrect Code" or other suitable message) via portal touchscreen 405. The process then proceeds to step 1050, where the user is re-prompted for his/her personal identification code and compartment identifier 530.

If the codes match, the end rental process proceeds to step 1070. At this step, kiosk 115 communicates information indicative of the match to user portal 120, which may then present the user with a message such as "success" or other suitable message informing the user that a match has occurred. In the event of a match, kiosk 115 also transmits an unlock signal to the locking mechanism 515 associated with the assigned storage compartment 110, thereby causing door 510 of the assigned storage compartment 110 to unlock and open automatically to permit access thereto.

At step 1075, kiosk 115 removes from centralized database 230 and/or kiosk database 335 the stored personal identification code associated with the assigned storage compartment 110 and frees the storage compartment 110 for subsequent rental. The user is then free to access storage compartment 110 one last time to remove his/her personal belongings, after which (i.e., upon closing door 510 of compartment 110) he/she is no longer permitted access to storage compartment 110. The process then ends at step 1045.

In an alternative embodiment, each user portal 120 is operable to permit access only to a subset of storage compartments, such as, for example, only storage compartments 110 in a column immediately adjacent to the user portal 120. This embodiment advantageously reduces queuing at user portals 120 by effectively splitting the user group into smaller subsets, each of which is required to use only a specific user portal 120 for accessing assigned storage compartments 110. Queuing may be reduced even further by ensuring that a rental process, such as the rental process described with respect to FIG. 6, more evenly distributes successive rentals of storage compartments 110 among different user portals 120. For example, in an embodiment where each user portal 120 permits access only to storage compartments 110 in a column immediately adjacent the user portal 120, a rental process may advantageously assign rentals in such as a way so as to better ensure that rented storage compartments 110 are distributed more evenly among columns.

With respect to embodiments employing a user portal 120 on each door 510 of storage compartment 110, each portal 120 may be configured to perform rental and/or access functions (such as those described with respect to FIGS. 6 and 10) with respect to any storage compartment 110 of electronic storage system 100. In another embodiment, each door mounted user portal 120 is configured to perform rental and/or access functions only with respect to the storage compartment 110 on which it is installed.

While the present invention has been illustrated by description of various embodiments and while those embodiments have been described in considerable detail, it is not the intention of applicants to restrict or in any way limit the scope of the invention to such details. Additional advantages and modifications will readily appear to those skilled in the art. The invention in its broader aspects is therefore not limited to the specific details and illustrative examples shown and described. Accordingly, departures may be made from such details without departing from the spirit or scope of the invention.

What is claimed is:

1. An electronic storage system, comprising:
a housing;
a plurality of securable units within the housing;
a kiosk configured to assign at least one of the securable units to a user and to provide the user with access credentials for accessing an assigned securable unit; and
a plurality of user portals within the housing and separate from the plurality of securable units and the kiosk, each user portal being configured to permit access to at least two of the plurality of securable units, at least one of the user portals being configured to permit access to the assigned securable unit in response to receiving the access credentials from the user;
wherein at least one of the user portals is further configured to assign at least one of the securable units to the user and to provide the user with the access credentials for accessing the assigned securable unit;
wherein each of the plurality of user portals is assigned to one of a plurality of subsets of the securable units, each subset being assigned to a respective one of the user portals, each user portal permitting access to only the subset of securable units assigned to the user portal and not permitting access to subsets of securable units not assigned to the user portal.

2. The electronic storage system of claim 1, wherein the access credentials include at least one of a personal identification code and a compartment identifier.

3. The electronic storage system of claim 1, wherein each subset of securable units includes a column of securable units and the housing includes a plurality of rails, the plurality of user portals being respectively positioned on the rails, each user portal permitting access only to a column of securable units adjacent to the user portal.

4. The electronic storage system of claim 1, wherein the at least one user portal configured to assign at least one of the securable units to the user is further configured to process payments for renting the assigned securable unit.

5. The electronic storage system of claim 1, wherein the kiosk is further configured to receive a text or SMS message containing the access credentials and to unlock the assigned securable unit in accordance with the access credentials received from the text or SMS message.

6. The electronic storage system of claim 5, wherein the access credentials include at least one of a personal identification code and a compartment identifier.

7. The electronic storage system of claim 4, wherein the payments processed by the user portal include payments processed from at least one of a credit card, a debit card, an RFID device, an NFC device, and a barcode.

8. The electronic storage system of claim 4, wherein at least one of the user portals is further configured to permit a rental of the assigned securable unit to be transferred to a new securable unit device.

9. The electronic storage system of claim 6, wherein the kiosk is further configured to obtain a telephone number from a caller-ID signal and to retrieve the compartment identifier from a database in accordance with the telephone number.

10. The electronic storage system of claim 9, wherein the kiosk is configured to unlock the assigned securable unit only if the telephone number obtained from the caller-ID signal matches a registration telephone number stored in a database during a rental process.

11. An electronic storage system, comprising:
a housing;
a kiosk configured to assign at least one of the securable units to a user and to provide the user with access credentials for accessing an assigned securable unit;
a plurality of securable units within the housing; and
a plurality of user portals within the housing and separate from the kiosk, at least one of the user portals being configured to assign at least one of the securable units to a user, to process payments for renting an assigned securable unit, and to provide the user with access credentials for accessing the assigned securable unit,
wherein each user portal is further configured to permit access to at least one of the plurality of securable units, at least one of the user portals being configured to permit access to the assigned securable unit in response to receiving the access credentials from the user;
wherein each of the plurality of user portals is assigned to one of a plurality of subsets of the securable units, each subset being assigned to a respective one of the user portals, each user portal permitting access to only the subset of securable units assigned to the user portal and not permitting access to subsets of securable units not assigned to the user portal.

12. The electronic storage system of claim 11, wherein each subset of securable units includes a column of securable units and the housing includes a plurality of rails, the plurality of user portals being respectively positioned on the rails, each user portal permitting access only to a column of securable units adjacent to the user portal.

13. The electronic storage system of claim 11, wherein at least one of the user portals is further configured to permit a rental of the assigned securable device to be transferred to a new securable device.

14. The electronic storage system of claim 11, wherein each user portal is positioned on a respective one of the securable devices.

15. An electronic storage system, comprising:
a housing;
a plurality of securable units within the housing;
a kiosk configured to assign at least one of the securable units to a user and to provide the user with access credentials for accessing an assigned securable unit; and
a unit configured to receive a text or SMS message containing the access credentials and to unlock the assigned securable unit in accordance with the access credentials received from the text or SMS message; and
a plurality of user portals within the housing and separate from the plurality of securable units and the kiosk,
wherein at least one of the user portals is further configured to assign at least one of the securable units to the user and to provide the user with the access credentials for accessing the assigned securable unit;
wherein each of the plurality of user portals is assigned to one of a plurality of subsets of the securable units, each subset being assigned to a respective one of the user portals, each user portal permitting access to only the subset of securable units assigned to the user portal and not permitting access to subsets of securable units not assigned to the user portal.

16. The electronic storage system of claim 15, wherein the unit is configured to receive the text or SMS message when the text or SMS message is sent to an access telephone number assigned to the storage system.

17. The electronic storage system of claim 15, wherein the kiosk is further configured to permit a rental of the assigned securable unit to be transferred to a new securable unit.

18. The electronic storage system of claim 16, wherein the kiosk is further configured to obtain a telephone number from a caller-ID signal and to retrieve the access credentials from a database in accordance with the telephone number.

19. The electronic storage system of claim 17, wherein the kiosk is further configured to obtain a telephone number from a caller-ID signal and to retrieve the access credentials from a database in accordance with the telephone number, wherein the kiosk is configured to unlock the assigned securable unit only if the telephone number obtained from the caller-ID signal matches a registration telephone number stored in the database.

20. The electronic storage system of claim 18, wherein the kiosk is configured to unlock the assigned securable unit only if the telephone number obtained from the caller-ID signal matches a registration telephone number stored in the database.

* * * * *